(12) United States Patent
Abdalla

(10) Patent No.: US 10,138,853 B2
(45) Date of Patent: Nov. 27, 2018

(54) WATER DISCHARGE SYSTEM AND METHOD

(71) Applicant: Cummins Filtration IP, Inc., Columbus, IN (US)

(72) Inventor: Wassem Abdalla, Cookville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 73 days.

(21) Appl. No.: 15/311,244

(22) PCT Filed: May 19, 2015

(86) PCT No.: PCT/US2015/031577
§ 371 (c)(1),
(2) Date: Nov. 15, 2016

(87) PCT Pub. No.: WO2015/179397
PCT Pub. Date: Nov. 26, 2015

(65) Prior Publication Data
US 2017/0107957 A1   Apr. 20, 2017

Related U.S. Application Data

(60) Provisional application No. 62/002,580, filed on May 23, 2014.

(51) Int. Cl.
*F02M 37/22* (2006.01)
*B01D 36/00* (2006.01)
(Continued)

(52) U.S. Cl.
CPC .......... *F02M 37/221* (2013.01); *B01D 17/02* (2013.01); *B01D 17/10* (2013.01); *B01D 35/005* (2013.01);
(Continued)

(58) Field of Classification Search
CPC ............. F02M 37/221; F02M 25/0221; F02M 25/0222; B01D 35/003; B01D 36/005;
(Continued)

(56) References Cited

U.S. PATENT DOCUMENTS 4,491,143 A   1/1985   Yasuhara
8,257,581 B2   9/2012   Ferrari
(Continued)

OTHER PUBLICATIONS

International Search Report and Written Opinion based on PCT/US2015/031577, dated Aug. 7, 2015, 7 pages.

*Primary Examiner* — Terry K Cecil
(74) *Attorney, Agent, or Firm* — Foley & Lardner LLP

(57) ABSTRACT

A fuel filtration system configured to separate water from fuel is described. The system includes a housing having an inlet for receiving fuel to be filtered, an outlet for supplying filtered fuel to a device, and an internal compartment having a drain. A filter media is positioned within the internal compartment of the housing, the filter media configured to separate the water from the fuel, the separated water routed out of the internal compartment through the drain. A solenoid valve is configured to provide both the separated water and fuel to an exhaust after-treatment device in fluid communication with the fuel filtration system.

15 Claims, 3 Drawing Sheets

(51) Int. Cl.
*B01D 17/02* (2006.01)
*B01D 17/00* (2006.01)
*B01D 35/00* (2006.01)

(52) U.S. Cl.
CPC ......... *B01D 36/001* (2013.01); *B01D 36/003* (2013.01); *B01D 36/008* (2013.01)

(58) Field of Classification Search
CPC ... B01D 36/006; B01D 36/008; B01D 36/001
See application file for complete search history.

(56) References Cited

U.S. PATENT DOCUMENTS

| | | |
|---|---|---|
| 8,409,446 B2 | 4/2013 | Abdalla |
| 8,551,335 B2 | 10/2013 | Wieczorek et al. |
| 2007/0186877 A1* | 8/2007 | Schulz ................. F02M 37/221 123/25 A |
| 2008/0110812 A1* | 5/2008 | Jensen ..................... B60S 1/50 210/143 |
| 2010/0096304 A1* | 4/2010 | Ganswein ............ B01D 36/008 210/86 |
| 2011/0041920 A1 | 2/2011 | Abdalla |
| 2013/0284675 A1 | 10/2013 | Core |

* cited by examiner

WATER DISCHARGE SYSTEM AND METHOD

CROSS REFERENCE TO RELATED APPLICATIONS

This application is a National Stage of PCT Application No. PCT/US2015/031577, filed on May 19, 2015, which claims priority to U.S. Provisional Patent Application No. 62/002,580, entitled "WATER DISCHARGE SYSTEM AND METHOD," filed on May 23, 2014. The contents of both applications are herein incorporated by reference in their entirety and for all purposes.

TECHNICAL FIELD

The present invention relates generally to the field of fuel filtration systems, and more specifically to the disposing of water separated from the fuel.

BACKGROUND

Fuel filtration systems remove various particulate and water from fuel prior to delivering the fuel to an external system, such as an internal combustion engine. The water separated from the fuel is stored in the fuel filtration system for periodic or continuous discharge from the fuel filtration system. Prior to the discharge (e.g., into the ambient), the water may be passed through an active carbon filter. An exemplary fuel filtration system is described in U.S. Patent Application Publication No. 2011/0041920, entitled "AUTOMATIC DRAINING SYSTEM TO DRAIN FLUID FROM A FILTER," which is herein incorporated by reference in its entirety and for all purposes.

A fuel filtration system of the above described existing design is shown in FIG. 1. The fuel filtration system of FIG. 1 includes at least three different solenoid valves: an air valve 10, a fuel valve 20, and a water discharge valve 30. The air valve 10 and the fuel valve 20 are positioned on a housing casting 40 of the emissions device. Additional valves may be included in emissions devices attached to the fuel filtration system. During operation, fuel is passed through the fuel filtration system. The fuel may contain water, which is removed or substantially removed by the fuel filtration system. The filtered fuel is then provided to the system (e.g., to an internal combustion engine) through a filter outlet. The fuel solenoid valve supplies fuel to an emissions after-treatment system (e.g., for periodic burn offs of particulate matter captured in exhaust after-treatment systems). The separated water is passed through an activated carbon filter 50 to remove trace fuel from the separated water. The separated water is periodically or continuously removed from the fuel filtration system through the water discharge valve 30. The water is discharged through manual operation (e.g., by a technician) or automatically based on sensor feedback from a water in fuel ("WIF") sensor 60.

The above described fuel filtration system's water removal system includes a dedicated water discharge valve, a WIF sensor, and a dedicated water treatment filter (the activated carbon filter). These components add cost and complexity to the fuel filtration system. Further, the fuel filtration system may require manual activation of the water discharge valve, which requires operator time and possible engine downtime.

SUMMARY

One embodiment of the invention relates to a fuel filtration system configured to separate water from fuel. The system includes a housing having an inlet for receiving fuel to be filtered, an outlet for supplying filtered fuel to a device, and an internal compartment having a drain passage that allows separated water and fuel to exit the housing. The system further includes a filter media positioned within the internal compartment of the housing, the filter media configured to separate the water from the fuel, the separated water routed out of the internal compartment through the drain passage. The system includes a solenoid valve configured to provide both the separated water and fuel to an exhaust after-treatment device in fluid communication with the fuel filtration system.

Another embodiment of the invention relates to a method of discharging separated water from a fuel filtration system. The method includes separating, through a filter media of the fuel filtration system, water from a fuel-water mixture. The method further includes draining, through a drain of a fuel filter housing of the fuel filtration system, the separated water to a fuel-water valve. The method includes discharging, through the fuel-water valve and via a conduit connecting the fuel filtration system to an after-treatment device in fluid communication with the fuel filtration system, the separated water to the after-treatment device. The method further includes discharging, through the fuel-water valve and via the conduit, fuel to the after-treatment device.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring generally to the figures, a fuel filtration system is described that is designed to discharge separated water from the filtration system automatically with no operator involvement. This insures that separated water is drained in a timely manner and provides the operator freedom from having to periodically perform a manual drain of the fuel filtration system. Additionally, the described fuel filtration system eliminates the need for a dedicated water discharge valve, a WIF sensor, and a dedicated water treatment filter (e.g., an activated carbon filter). The described fuel filtration system drains the separated water from the fuel filtration system with fuel through an after-treatment fuel solenoid valve, where the water is evaporated in the exhaust system of the internal combustion engine, thereby eliminating the need for a dedicated discharge valve and a dedicated water filter.

Figure 2:
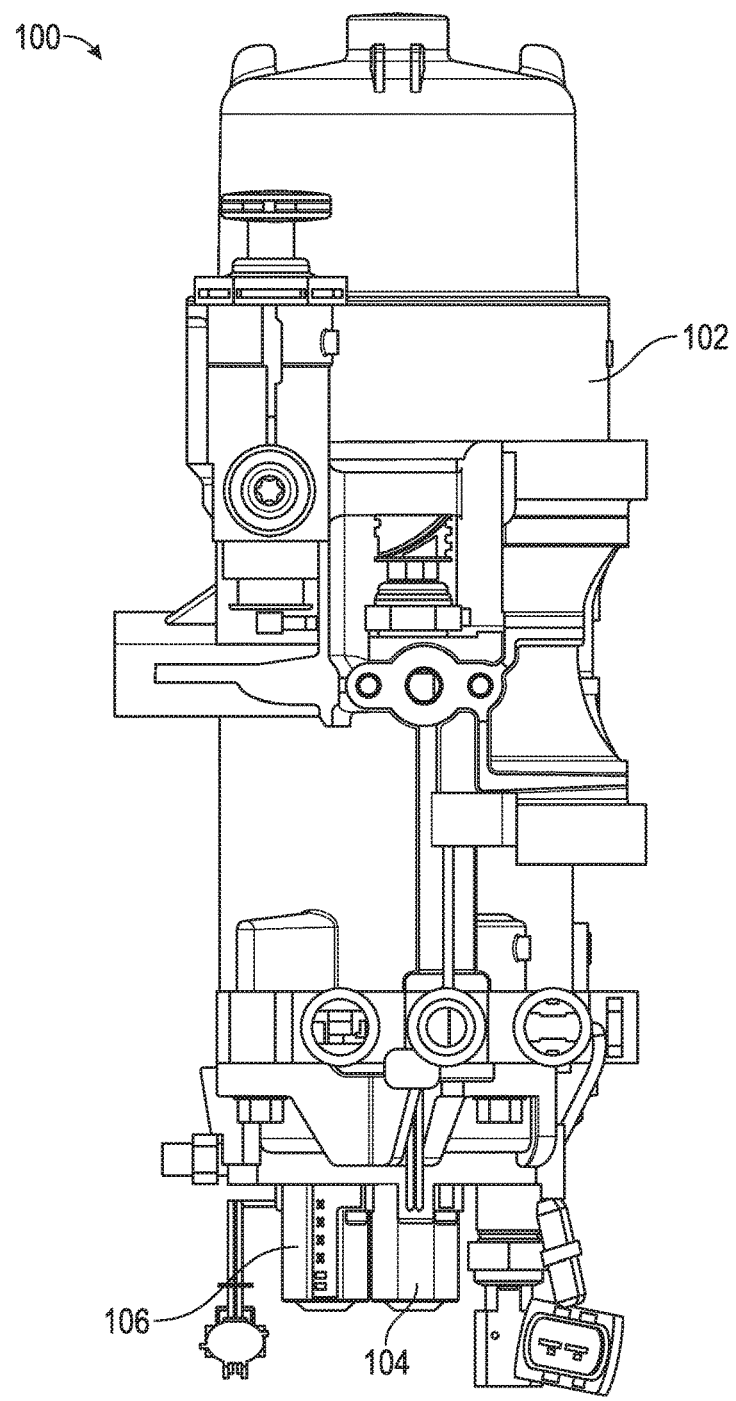
FIG. 2 is a perspective view of a fuel filter system according to an exemplary embodiment.

Referring to FIG. 2, a fuel filtration system 100 is shown according to an exemplary embodiment. The fuel filtration system 100 includes a filter housing 102. The filter housing 102 may be made of cast metal (e.g., cast iron, cast aluminum, etc.). The filter housing 102 includes an inlet that provides fuel to be filtered to the filter housing 102 and an outlet that supplies filtered fuel to a device. The device may be an internal combustion engine. The filter housing 102 includes an internal compartment that includes a filter cartridge having filter media. Exemplary fuel filtration systems are described in U.S. Pat. No. 8,409,446, U.S. Pat. No. 8,517,185, and U.S. Pat. No. 8,551,335, each of which are incorporated by reference in their entireties and for all purposes. In an alternative arrangement, the fuel filtration system 100 separates water from fuel without the use of filter media (e.g., via a centrifuge like device).

The fuel filtration system 100 includes two valves: an air valve 104 and a fuel-water valve 106. The valves 104 and 106 may be electromagnetic solenoid valves. The valves are positioned at the bottom of the filter housing 102. The fuel-water valve 106 serves two purposes. The first purpose of the fuel-water valve 106 is to drain separated water from the fuel filtration system 100. The separated water sinks to the bottom of the housing 102, which is where the fuel-water valve 106 is located, due to its higher density than the fuel. The drained water is pushed through the fuel-water valve 106 to the after-treatment device, where the separated water is evaporated by the heat of the after-treatment device. The second purpose of the fuel-water valve 106 is to provide fuel to the after-treatment device (e.g., an after-treatment device of an internal combustion engine) for a regeneration process in the after-treatment device (e.g., a burn-off of gathered exhaust particulate in a particulate filter). The second purpose of the fuel-water valve 106 (i.e., the provision of fuel to the after-treatment device) takes place after completing the first purpose of the fuel-water valve 106 (i.e., the discharge of separated water from the fuel filtration system 100) because the discharge of all of the separated water allows the lower density fuel to arrive at the bottom of the housing 102. After completing the two previously mentioned purposes of the fuel-water valve 106, the air valve 104 discharges air from the vehicle air compressor 112 to clean or flush any remaining water or fuel residues from the operations of the fuel-water valve 106. This cleaning process prevents possible damages or rust to the fuel and water passage. Accordingly, the fuel filtration system 100 utilizes two solenoid valves (104 and 106) to perform the same functions of the three solenoid valves (10, 20, and 30) of the prior art arrangement shown in FIG. 1. The after-treatment device may include devices such as particulate filters, catalytic devices, diesel exhaust fluid dosing devices, decomposition reactors, and the like. In the after-treatment device, the supplied fuel is burned during the regeneration process and the heat from the burning fuel and the exhaust gases vaporize the separated water such that it can be discharged into the atmosphere. In an alternative arrangement, the fuel-water valve 106 provides the fuel-water mixture to another device for proper disposition or disposal of the separated water without imposing impact to the environment (e.g., a device that filters and evaporates the separated water and discharges the evaporated water to the atmosphere).

Figure 3:
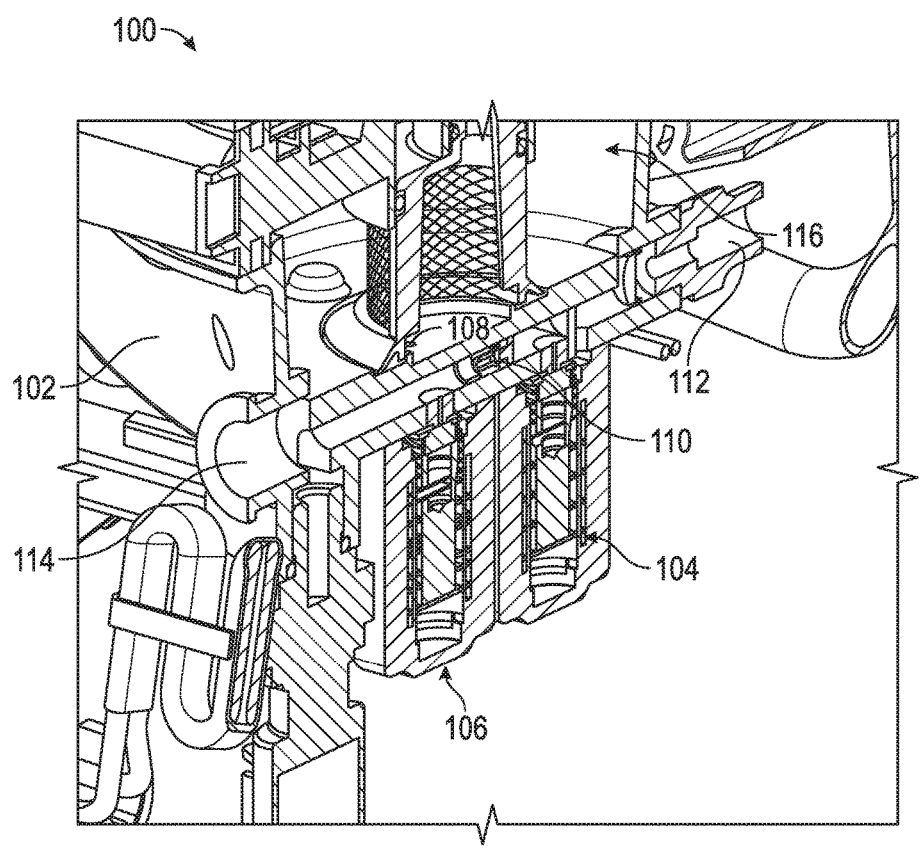
FIG. 3 is a cross-sectional view of the fuel filter system of FIG. 2.

Referring to FIG. 3, a perspective cross-sectional view of a bottom portion of the fuel filtration system 100 is shown. The housing 102 includes a drain passage 108. The drain passage 108 allows for the water separated during the filtering process to be drained from the housing 102. The drain passage 108 is in fluid communication with the fuel-water valve 106. The separated water is later discharged to the after-treatment device along with fuel through the fuel-water valve 106 and out an after-treatment outlet 114 to the after-treatment device during a regeneration process. A check valve 110 prevents the fuel or water from backtracking into the air valve 104 while allowing air from the air compressor 112 to flow through to the after-treatment device (e.g., to force the fuel-water mixture to the after-treatment device). In some arrangements, the housing 102 includes a water sump 116.

Figure 1:
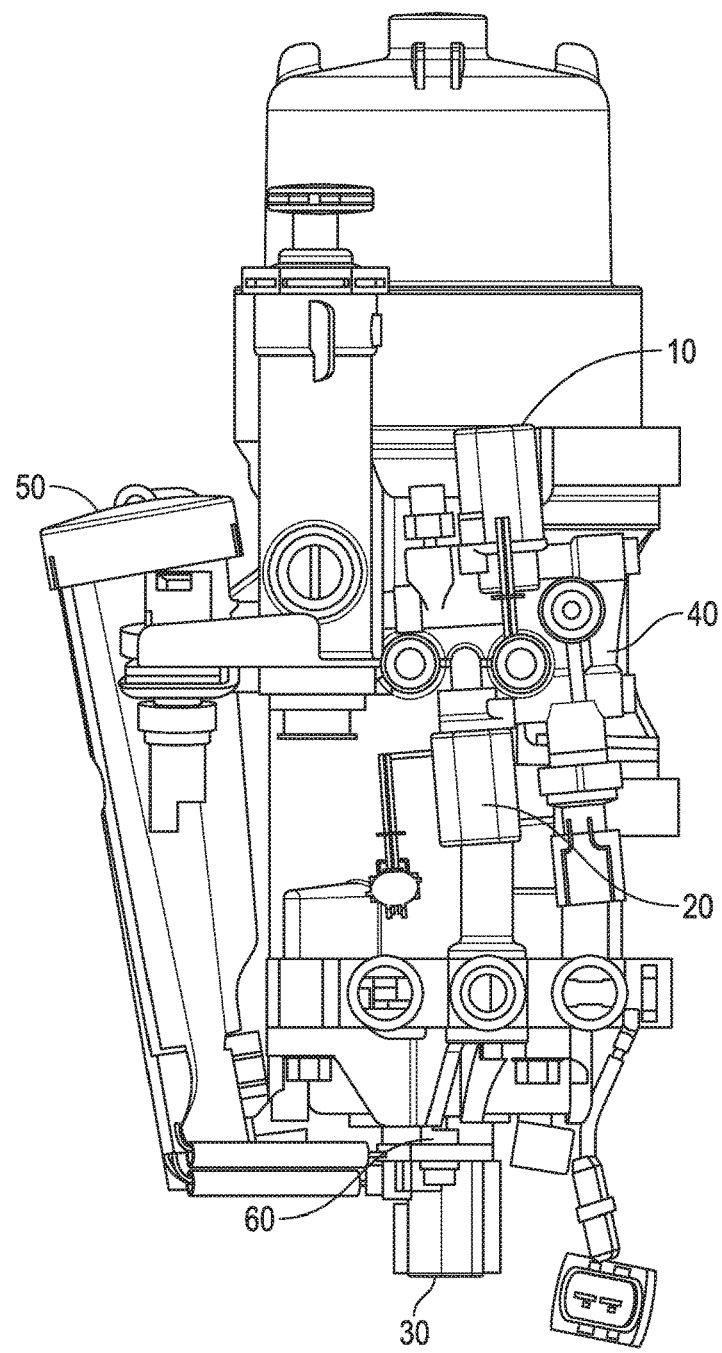
FIG. 1 is a perspective view of a prior art fuel filter system.

The above described fuel filtration system 100 provides many advantages over a prior art fuel filtration system (e.g., as described with respect to FIG. 1). The above described fuel filtration system 100 eliminates the need for a dedicated water discharge valve thereby reducing the number of discharge valves to two. The reduction in the number of valves is accomplished by passing the separated water through a fuel discharge valve that provides fuel to another device (e.g., an after-treatment system, a water evaporator, or the like). The reduction in the number of valves also provides a simplified plumbing setup for the fuel filtration system 100. Further, the above described fuel filtration system 100 also eliminates the need for a WIF sensor, a separate casting in the filter housing 102 for emissions devices, and an activated carbon filter for the separated water because fuel contained in the separated water is burned off in the after-treatment system.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fuel filtration system configured to separate water from fuel, the system comprising:
    a housing having an inlet for receiving fuel to be filtered, an outlet for supplying filtered fuel to a device, and an internal compartment having a drain passage that allows separated water and fuel to exit the housing;
    a filter media positioned within the internal compartment of the housing, the filter media configured to separate the water from the fuel, the separated water routed out of the internal compartment through the drain passage;
    a first solenoid valve configured to provide both the separated water and fuel to an exhaust after-treatment device in fluid communication with the fuel filtration system; and
    a second solenoid value configured to discharge air from an air compressor in fluid communication with the fuel filtration system through the drain passage.

2. The system of claim 1, further comprising a check valve positioned along the drain passage between the first solenoid valve and the second solenoid valve, the check valve preventing fuel and separated water from backtracking into the second solenoid valve while permitting discharged air from the air compressor to flow through the drain passage and to the after-treatment device.

3. The system of claim 1, wherein the system does not include a dedicated water discharge valve.

4. The system of claim 1, wherein the system does not include a filter for the separated water.

5. The system of claim 1, wherein the housing is a cast metal housing.

6. The system of claim 1, wherein the first solenoid valve is positioned at a bottom portion of the housing such that separated water is provided to the after-treatment device prior to fuel being provided to the after-treatment device due to the separated water having a higher density than the fuel.

7. The system of claim 1, wherein the after-treatment device is a particulate filter.

8. The system of claim 1, wherein the after-treatment device is a catalytic device.

9. The system of claim 1, wherein the after-treatment device is a diesel exhaust fluid dosing device.

10. The system of claim 1, wherein the after-treatment device is a decomposition reactor.

11. A method of discharging separated water from a fuel filtration system comprising:
    separating, through a filter media of the fuel filtration system, water from a fuel-water mixture;
    draining, through a drain of a fuel filter housing of the fuel filtration system, the separated water to a fuel-water valve;
    discharging, through the fuel-water valve and via a conduit connecting the fuel filtration system to an after-treatment device in fluid communication with the fuel filtration system, the separated water to the after-treatment device;
    discharging, through the fuel-water valve and via the conduit, fuel to the after-treatment device; and
    discharging, through an air valve and via the conduit, air to the after-treatment device.

12. The method of claim 11, wherein discharging the separated water through the fuel-water valve occurs before discharging the fuel through the fuel-water valve.

13. The method of claim 11, wherein discharging the air through the air valve occurs after discharging the separated water through the fuel-water valve.

14. The method of claim 13, wherein discharging the air through the air valve occurs after discharging the fuel through the fuel-water valve.

15. The method of claim 13, further comprising burning, at the after-treatment device, fuel received from discharging fuel through the fuel-water valve.

* * * * *